Patented Aug. 11, 1925.

1,548,932

UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ACETATE COMPOSITION.

No Drawing.   Application filed June 16, 1924.  Serial No. 720,166.

*To all whom it may concern:*

Be it known that I, HANS T. CLARKE, a subject of the King of Great Britain, residing at Rochester, in the county of Monroe and State of New York, have invented certain new and useful Improvements in Cellulose-Acetate Compositions, of which the following is a full, clear, and exact specification.

This invention relates to a new composition of matter in which cellulose acetate is combined or mixed with other substances so that the resulting product can be advantageously used in the plastic and analogous arts, such for instance as sheet or film manufacture and varnish manufacture.

One object of the invention is to provide a composition which may be made into permanently transparent, strong and flexible sheets or films of desired thinness, which are substantially waterproof, are unaffected by ordinary photographic fluids, and possess the desired properties of a support for light-sensitive photographic coatings. Another object of my invention is to produce a composition capable of easy manipulation in the plastic and film-making, or varnish making, or allied arts; but will not injure or be injured by the substances with which it is associated during manufacture, storage or use. Still another object of my invention is to provide a film having the hereinabove described properties. Other objects will hereinafter appear.

I have found that a composition having the desirable qualities hereinabove enumerated can be produced by mixing cellulose acetate, such as acetone-soluble cellulose acetate for instance, with pentaerythritol tetracetate under such conditions that the composition exists in a colloidized state. I shall describe an embodiment of my invention by way of example, but it will be understood that my invention is not restricted thereto except as indicated in the appended claims.

In carrying out one embodiment of my invention for instance, 100 parts of cellulose acetate (say the acetone-soluble species) is dissolved along with 1 to 50 parts (say 20 parts) of pentaerythritol tetracetate in a volatile vehicle containing a common solvent, say 300 to 400 parts of acetone. The proportions throughout are by weight. This gives a flowable film-forming composition or dope suitable for spreading out into coatings, which upon the evaporation of the common solvent leave transparent, tough, flexible sheets. The customary film-making or sheet-making processes and apparatus being employed.

Where compositions of greater flowing quality are desired, the amount of volatile solvent may be increased and diluents, such as benzol, ethyl alcohol, methyl alcohol, and the like, may be added, provided precipitation is not produced or the product rendered too hazy or whitish. In order to control the rate of the evaporation, substances of low volatility may be added, such as the higher alcohols like the various propyl, butyl and amyl alcohols or mixtures of them. An amount of butyl alcohol, for example, which will control the rate of evaporation may be $\frac{1}{10}$ to $\frac{1}{5}$ the weight of cellulose acetate. Part of this alcohol will under such circumstances remain in the film and enhance the flexibility thereof. Other substances which impart characteristic qualities to the film may be added to the flowable dope, such, for instance, as triphenyl or tricresyl phosphate, camphor, monochlornaphthalene, and the like. The proportion of these or any mixture of them should not, however, be sufficient to cause precipitation or whitening in the film, especially where the latter is to be used for photographic purposes.

The ingredients are of the commercial type sufficiently purified for the end in view; for film manufacture, they are chosen so as to have the proper relative freedom from color.

Having thus described my invention, what I claim as new and desire to secure by Letters Patent is:

1. A composition in a colloidized state, comprising cellulose acetate and pentaerythritol tetracetate.

2. A flowable composition comprising cellulose acetate, pentaerythritol tetracetate and a common solvent.

3. A flowable film-forming composition, comprising 100 parts of acetone-soluble cellulose acetate, 1 to 50 parts of pentaerythritol tetracetate, and over 300 parts of a liquid vehicle including a volatile common solvent.

4. As an article of manufacture, a sheet comprising cellulose acetate and pentaerythritol tetracetate.

5. As an article of manufacture, a transparent, flexible, deposited or flowed sheet containing acetone-soluble cellulose acetate and pentaerythritol tetracetate.

Signed at Rochester, New York this 10th day of June 1924.

HANS T. CLARKE.